Patented Nov. 1, 1938

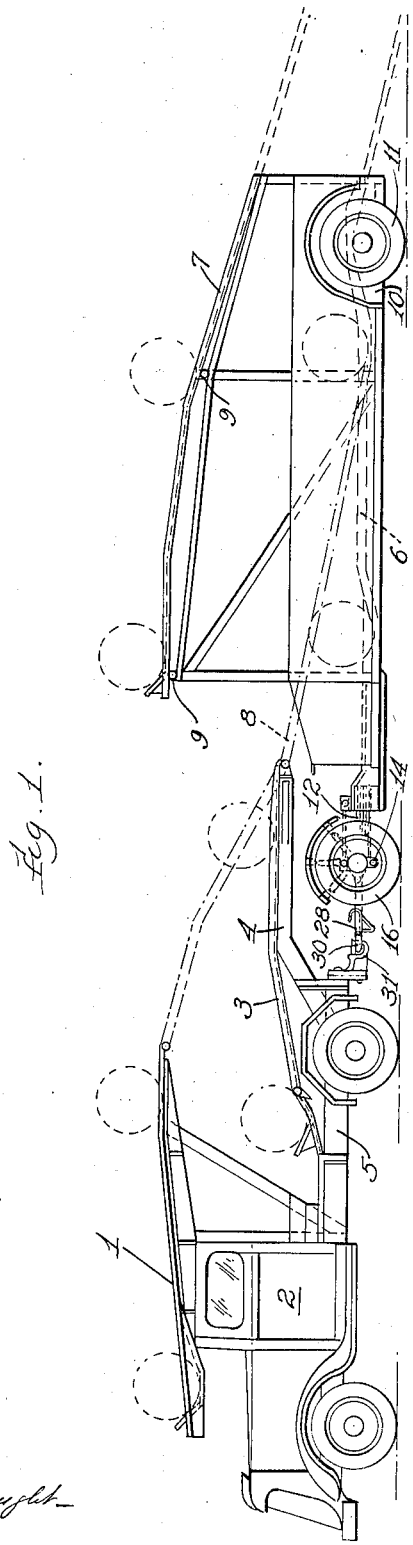

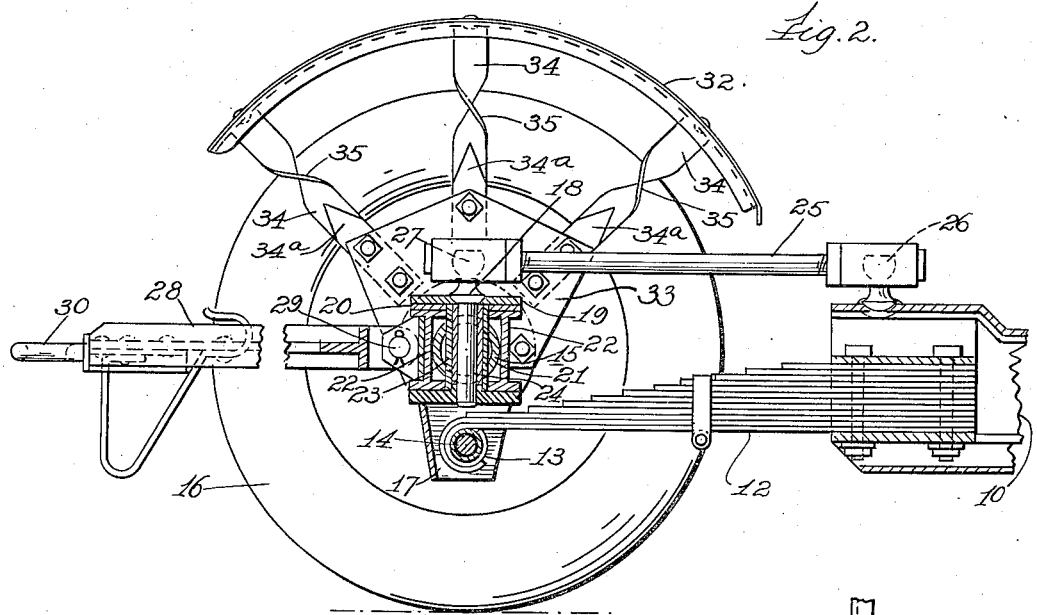
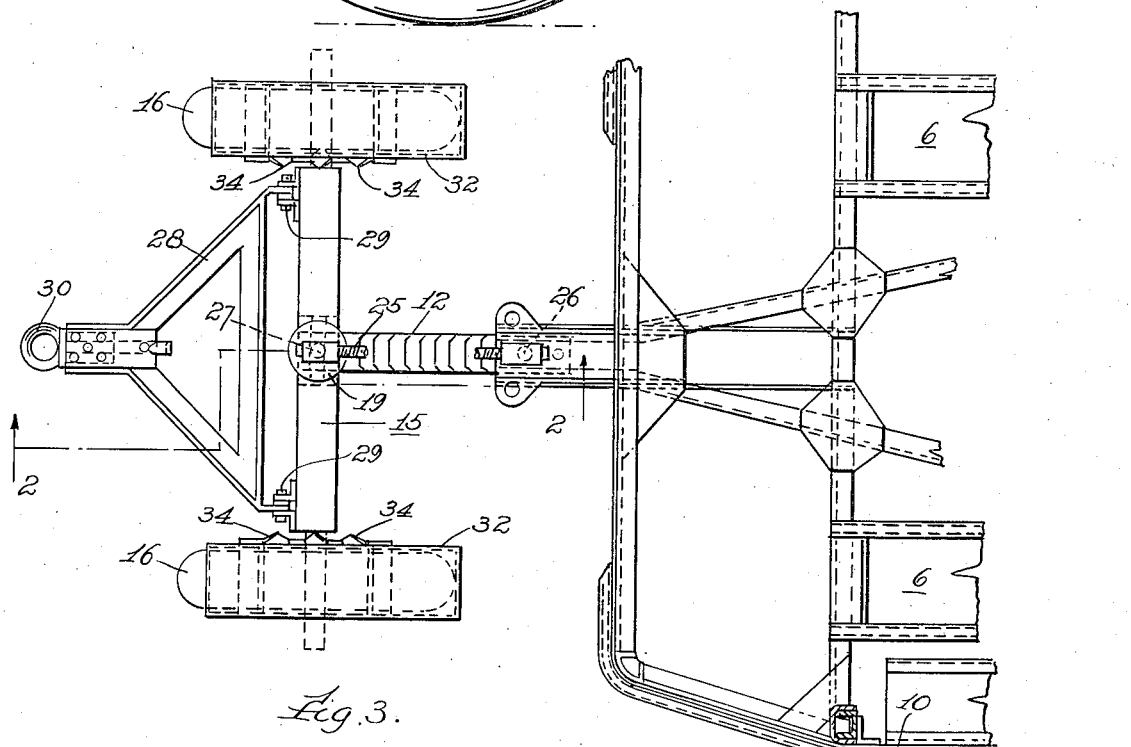

2,135,301

UNITED STATES PATENT OFFICE 2,135,301

ROAD VEHICLE CONSTRUCTION

Eugene J. Dondlinger, Chicago, Ill.

Original application July 11, 1935, Serial No. 30,812. Divided and this application July 20, 1936, Serial No. 91,531

8 Claims. (Cl. 280—33.2)

This application is a division of my application Serial No. 30,812, filed July 11, 1935.

This invention relates to road vehicles, and primarily to the trailer type of vehicle intended to be coupled to a motor car or a truck. It is particularly concerned with a type of construction in which the main frame of the vehicle is carried close to the ground, and for purposes of illustration I have shown the invention embodied in a trailer designed for transporting automobiles and motor trucks, usually from the factory to the sales branch or dealer. One object of the invention is to provide a simple and satisfactory connection between the steering axle of the trailer and the trailer frame, together with a draw-bar for coupling it to the tractor vehicle in a manner to secure accurate steering of the trailer. The invention consists in certain features and elements of construction in combination, as herein shown and described and as indicated by the claims.

In the drawings:

Figure 1 is a side elevation of a combined tractor and trailer vehicle embodying this invention.

Figure 2 is a vertical section through the middle of the steering axle of the trailer, taken substantially as indicated at line 2—2 on Figure 3.

Figure 3 is a plan view of the front end portion of the trailer vehicle showing the steering axle and its connection to the trailer frame, with certain parts broken away.

As shown in Figure 1, the tractor-trailer vehicle in which the invention is embodied is shown as designed to accommodate four automobiles; one is carried on a run-way at 1, disposed over the driver's position, and extending adjacent and partially above the driver's cab, 2. Another is carried on a run-way, 3, which is partly supported by an upwardly and rearwardly bent frame extension, 4, secured to the main frame, 5, of the tractor vehicle. The trailer vehicle includes a run-way, 6, forming a portion of its floor for supporting a third automobile, and a fourth is carried above the third on suitable tracks, 7, supported by upwardly extending side frames of the trailer. Figure 1 indicates by dotted outline how the hinged run-way, 3, may be swung upwardly to connect with the run-way, 1, to form a portion of a ramp for loading a vehicle onto the run-way, 1, a temporary inclined ramp, 8, being extended through the trailer vehicle for this purpose. When a vehicle is thus driven or drawn over these inclined tracks, it is necessary to provide clearance for the upper portion of such vehicle between the side frames of the trailer; and, consequently, the cross bars, 9, and associated brackets which support the upper tracks, 7, are made so that they can be swung clear of this path temporarily, and then replaced for supporting the fourth vehicle, which is the last one loaded onto the transport. The details of this arrangement are described more fully in my co-pending application Serial No. 30,812.

The trailer vehicle is of the four-wheel type, supporting its load independently of the tractor and merely coupled to the latter. At the rear the trailer frame, 10, is carried on rear wheels, 11, and at the forward end the frame is provided with a rigidly mounted cantilever leaf spring, 12, whose flexible end extends forwardly and is formed with an eye, 13, which engages a spring bolt, 14, shown in Figure 2, just below the axle, 15, of the front wheels, 16. This front axle, 15, may be substantially straight, as shown, and is of the rigid type. The spring bolt, 14, is carried in a fitting, 17, which is rigidly secured by welding to the lower end of the king bolt, 18, passing through the axle, 15, at the middle of its length to provide a pivotal connection between the axle and the frame for steering of the front wheels, 16. At the upper end the king bolt is furnished with a broad bearing disk, 19, which may be rigidly secured to the bolt, as by welding, and a suitable wear plate, 20, is interposed between this broad head, 19, of the bolt, and the upper surface of the axle, 15. As shown, the axle is made up of an inner tubular portion, 21, encased in flat plate or channel sections, 22, giving it a rectangular form, and at the middle of its length the whole assembly, including the tube, 21, is bored vertically to receive a vertical tube, 23, within which a bushing, 24, provides a suitable bearing for the king bolt, 18.

The load is transmitted from the frame, 10, through the spring, 12, to the front axle by means of the king bolt and its broad bearing head, 19, and to some extent the draft is, of course, transmitted by the spring, 12. In addition I provide a draft rod, 25, having ball-and-socket connections at 26 and 27 with the frame and with the upper end of the king bolt, 18, respectively. The universal connections at the ball-and-socket joints permit the axle, 15, to rock transversely to the extent permitted by the flexibility of the spring, 12, and frame, 10, while, at the same time, there is no looseness in the draft connection between the axle, 15, and the frame, 10. This ensures accurate steering of the trailer so that it will track properly behind the truck. Accurate steering is further ensured by the arrangement of the triangular draw-bar, 28, which, as seen in Figure 3, is connected by horizontal pivots, 29, to the axle, 15, at widely separated points adjacent the wheels, 16. The draw-bar terminates at its forward end in an eye, 30, dimensioned to engage a standard pintle hook, 31, seen in Figure 1, secured to the rear of the truck frame, 5.

Since the front wheels, 16, swing through a relatively wide arc in the steering movement, I prefer to mount the "mud guards" or fenders, 32, on the axle, 15, so that their position relative to the wheels will be fixed. For this purpose an anchorage in the form of a plate, 33, is secured to each end of the axle, and the curved fender, 32, is supported by three arms, 34, each made of flat spring stock, bolted to the plate, 33, at the inner end and bent at right angles at the outer end for securement against the inner surface of the fender, 32. Preferably, the inner end of each arm is composed of three thicknesses or leaves, the longest one being secured between two shorter ones, 34ᵃ, and the long leaf being twisted through substantially 180 degrees, as seen at 35. I find that this eliminates the otherwise serious vibration which would tend to loosen the fastenings, because the fender is mounted directly to an unsprung element, the axle, 15.

While there is shown and described herein certain specific structure embodying the invention, it will be manifest to those skilled in the art that various modifications and re-arrangements of the parts may be made without departing from the spirit and the scope of the invention, and that the same is not limited to the particular form herein shown and described, except in so far as indicated by the appended claims.

I claim:

1. A road vehicle including a pair of front wheels, a pair of rear wheels, a frame supported on said rear wheels and extending forwardly therefrom, a rigid axle connecting the front wheels, and a vertically flexible spring member mounted at the forward end of the frame and extending forwardly to said axle, together with a vertical pivot connecting said member to the axle at the middle permitting steering movement of the latter, and supplemental draft means extending from the forward part of the frame and hingedly attached to said pivot at a point spaced vertically from the connection of the spring thereto.

2. A road vehicle including a pair of front wheels, a pair of rear wheels, a frame supported on said rear wheels and extending forwardly therefrom, a rigid axle connecting the front wheels, and a vertically flexible spring member mounted at the forward end of the frame and extending forwardly to said axle, together with a vertical pivot connecting said member to the axle at the middle to permit steering movement of the latter, and a draft member connected to the axle substantially at the axis of said pivot and also to the frame with capacity for changing its angular relation to said pivot axis and to the frame upon flexure of the said spring member.

3. A road vehicle including a pair of front wheels, a pair of rear wheels, a frame supported on said rear wheels and extending forwardly therefrom, a rigid axle connecting the front wheels, a vertically flexible leaf spring member mounted at the forward end of the frame and terminating in an eye adjacent said axle, a vertically extending king bolt at the middle of the length of said axle, a fitting on the lower end of the bolt below the axis of the axle and including a transverse pivot engaging the spring eye, and a draft rod connecting the upper end of the king bolt with the forward part of the frame.

4. A road vehicle including a pair of front wheels, a pair of rear wheels, a frame supported on said rear wheels and extending forwardly therefrom, a rigid axle connecting the front wheels, a vertically flexible leaf spring member mounted at the forward end of the frame and terminating in an eye adjacent said axle, a vertically extending king bolt at the middle of the length of said axle, and a fitting on one end of the bolt including a transverse pivot engaging the spring eye, together with a draft rod connecting the other end of the king bolt with the forward part of said frame.

5. In the combination defined in claim 4, the connections of the draft rod to the king bolt and to the frame being of universal-pivotal character to permit the axle to rock in its own vertical plane to the extent permitted by the torsional flexibility of the spring member.

6. A trailer vehicle including a pair of front wheels, a pair of rear wheels, a frame supported on said rear wheels and extending forwardly therefrom, a rigid axle connecting the front wheels, and a vertically flexible spring member mounted at the forward end of the frame and extending forwardly to said axle, said axle having a vertically extending bushing disposed at the mid-point of its length, a fitted king bolt in said bushing, means at one end of said king bolt by which the forward end of the spring is attached thereto, a draft rod connecting the other end of the king bolt with the forward end of the frame, the draft rod connections being of the ball-and-socket type, and a draw-bar for coupling the trailer to a tractor vehicle, said draw-bar being connected to the axle at widely separated points respectively adjacent the wheels thereon to ensure accurate steering action.

7. In a road vehicle which includes a pair of rear wheels, a frame supported on said wheels and extending forwardly therefrom, a second pair of wheels disposed ahead of the first mentioned pair, a rigid axle connecting the second pair, a vertically extending king bolt at the middle of the length of said axle, a vertically flexible leaf spring mounted on the frame and extending forwardly toward said axle, means at one end of the king bolt by which the forward end of said spring is attached to the king bolt, and supplemental draft means extending from the forward part of the frame and attached to said king bolt at a point spaced vertically from the connection of the spring thereto.

8. In a road vehicle which includes a pair of rear wheels and a frame supported on said wheels and extending forwardly therefrom, a transverse member to which the forward end of said frame is connected by a vertically extending pivotal member located at the middle of the length of said transverse member, and a vertically flexible leaf spring mounted on the frame and extending forwardly toward said transverse member, means at one end of the pivotal member by which the forward end of said spring is attached thereto, and supplemental draft means extending from the forward part of the frame and attached to said pivotal member at a point spaced vertically from the connection of the spring thereto.

EUGENE J. DONDLINGER.